(12) United States Patent
    Hamilton

(10) Patent No.: US 12,587,033 B1
(45) Date of Patent: Mar. 24, 2026

(54) LARGE ENERGY ABSORPTION AND DISTRIBUTION SYSTEM

(71) Applicant: David Hamilton, Chatham, NJ (US)

(72) Inventor: David Hamilton, Chatham, NJ (US)

( * ) Notice: Subject to any disclaimer, the term of this patent is extended or adjusted under 35 U.S.C. 154(b) by 0 days.

(21) Appl. No.: 17/945,432

(22) Filed: Sep. 15, 2022

Related U.S. Application Data

(63) Continuation of application No. 17/111,479, filed on Dec. 3, 2020, now abandoned.

(60) Provisional application No. 62/943,230, filed on Dec. 3, 2019.

(51) Int. Cl.
    *H02J 50/00* (2016.01)
    *H02H 9/04* (2006.01)
(52) U.S. Cl.
    CPC .............. *H02J 50/001* (2020.01); *H02H 9/04* (2013.01)
(58) Field of Classification Search
    CPC ........... H02J 50/001; Y02E 10/00; H02H 9/00
    See application file for complete search history.

(56) References Cited

U.S. PATENT DOCUMENTS

| | | | | |
|---|---|---|---|---|
| 2008/0128559 A1* | 6/2008 | Ho | .................... | B64G 1/1021 244/164 |
| 2010/0220424 A1* | 9/2010 | Ibok | .................... | H05F 7/00 361/117 |
| 2012/0029853 A1* | 2/2012 | Baumheinrich | ........ | F03D 80/30 702/65 |
| 2013/0093261 A1* | 4/2013 | Allen | .................... | H02G 13/20 307/149 |
| 2014/0042987 A1* | 2/2014 | Lai | .................... | H05F 7/00 320/166 |

* cited by examiner

*Primary Examiner* — Rexford N Barnie
*Assistant Examiner* — Joseph N Inge
(74) *Attorney, Agent, or Firm* — Timothy J Bortree

(57) ABSTRACT

An energy absorption and distribution system, comprises an environmental energy collection system and a transient high energy management system, wherein the environmental energy collection system includes an energy receptor array configured to receive energy from an environment, an energy source sensor array configured to monitor the environment for a source of energy, and an energy channeling array configured to guide the energy from the source to the energy receptor array; and wherein the transient high energy management system includes an energy surge control array configured to control the flow of energy received from the energy receptor array, an energy absorption array configured to absorb energy from the energy surge control array, and an energy storage array configured to store energy from the energy absorption array.

20 Claims, 3 Drawing Sheets

LARGE ENERGY ABSORPTION AND DISTRIBUTION SYSTEM

CROSS REFERENCE TO RELATED APPLICATIONS

The present application claims priority from U.S. patent application Ser. No. 17/111,479 (filed Dec. 3, 2020), which claims priority from U.S. Provisional Application No. 62/943,230 (filed Dec. 3, 2019). The entire disclosures of both aforementioned applications, including but not limited to any and all references cited therein or thereby, are incorporated herein by reference.

FIELD OF THE INVENTION

The invention relates generally to energy collection and management, and more specifically to transient high energy collection and management.

BACKGROUND OF THE INVENTION

Humans have worked to extract energy from environmental sources for many millennia, from the use of water wheels and windmills, archimedes screws and even ancient Parthian batteries created through the use of clay jars, conductive rods and electrolytic solutions. While energy was often sought to be stored and typically translated to various forms of power for more immediate use, methods of storage were often quite limited in terms of capacity and density.

Benjamin Franklin not only showed the possibility of directing lightning's electrical current flow by using a kite and a key but he also used leyden jars (early capacitors) to demonstrate electricity from lightning was no different than that of other sources.

Today, we have high density batteries and supercapacitors providing energy to our vehicles and devices long after the coal was burned to produce the electricity that made its way from the grid, through the power receptacles and into the vehicle.

However, generating power has become expensive, and many have understandably turned to capturing the abundance of energy available in our environment. While most environmental sources produce energy at steady and immediately usable levels, other sources, such as lightning, deliver vast quantities of energy in short periods of time. As such, these transient high energy events and sources have historically been treated as perilous dangers to avoid, rather than sources of energy to be harnessed.

Standard practice for dealing with the threat of lightning has been to either attract lightning to lightning rods and direct it safely to ground to be absorbed by the earth or to deter strikes from occurring within a certain area. While these are somewhat effective safety measures, they come with the cost of a tremendous waste of readily available energy.

Lightning is not the only source of transient high energy. However, there currently exists no system for collecting energy from transient high energy sources, and managing it for storage and later use.

As the need for renewable, sustainable energy becomes more apparent and prevalent, so does the need for a transient high energy collection and management system.

SUMMARY OF THE INVENTION

The invention advantageously fills the aforementioned deficiencies by providing a large energy absorption and distribution system and methods for use thereof.

The following descriptions of features and aspects of the invention are not meant to limit the scope of the invention, but rather to merely provide examples of preferred embodiments. Terms and phrases used are intended to have and convey their dictionary and common usage meanings, as well as or including, without limitation, the meanings specified. Terms and phrases used to convey direction or position, whether relative or absolute, are merely examples and do not limit the invention to only those directional or positional terms and phrases used, but rather the invention encompasses embodiments having components or features that are directed or positioned differently. To the extent that any refer to functionality or purpose in any way, they are intended to convey, in addition to their dictionary and common usage meanings, any arrangement, combination, or interaction of physical objects, hardware, and/or software that is suitable to any degree, whether partially or fully, for accomplishing and/or effecting the function or intended result. Further, in addition to any preferred embodiments described, the invention encompasses embodiments having features and aspects that fall into the broadest possible categories to which the described preferred features and aspects belong.

Large Energy Absorption and Distribution System

In preferred aspects, the invention is configured to collect transient high energy, and potential energy, from environmental sources (such as, for example, lightning, ionization clouds, ionizing radiation, coronal mass ejections) and man-made sources (e.g., rapid chargers, electromagnetic bursts), and manage it for storage and use. While certain embodiments of the invention include both collection and management features, some embodiments include only one of such aspects. That is, the invention includes novel features for the collection of transient high energy from environmental and man-made sources, and includes novel features for the management of the received transient high energy.

Accordingly, in various embodiments, aspects of the invention can be applied to effect one or more of the following solutions, in addition to other solutions made possible by the present disclosure:

(1) a stationary energy collection and storage farm, located in a location that through environmental analysis is determined to frequently experience transient high energy events, that collects transient high energy from an environmental energy source (e.g., lightning) using an absorption array and manages processing and storage of the energy into a high energy density form, such as, into an on-site battery array, through methods including but not limited to electromagnetic transmission of energy;

(2) a mobile energy collection and storage vehicle (e.g., a truck, airplane, or boat) that travels to locations that through environmental analysis are determined to frequently experience transient high energy events, to collect transient high energy from environmental energy sources (e.g., lightning) and manage processing and storage (e.g. into on-vehicle batteries) or use of the energy;

(3) a consumer vehicle (e.g., a car or truck) configured to accept transient high energy from a man-made energy source (e.g., a rapid charger or electromagnetic radiation field generator), or collect transient high energy from an environmental energy source (e.g., lightning) and manage processing and storage of the energy into on-vehicle batteries and use of the energy in vehicle connected systems;

(4) transient high voltage energy suppressors or arrestors (e.g., lightning rods) (whether new or retrofitted), located on existing or new infrastructure, configured to capture transient high energy from an environmental energy source (e.g., lightning) and manage processing and storage of the energy into on-site batteries and use of the energy for on-site systems;

(5) a space-faring vehicle (e.g., satellite, space station, rocket, rover) having on or integrated into a skin or antenna of the vehicle a receptor array (e.g., antennae or nodes) for collecting transient high energy from an outer space environment (e.g., ionizing radiation or energy from coronal mass ejections), and having integrated into the vehicle components for managing processing and storage of the energy into on-vehicle batteries, use of the energy in on-vehicle systems, and transfer of the energy to other vehicles or systems; and (6) other systems including one or more components of the disclosed system to power and/or otherwise utilize the following, as examples, without limitation, for (a) residential and commercial structures (e.g., with receptor arrays serving as antennae), (b) cell phone towers, (c) skyscrapers, (d) high voltage power line towers, (e) battery farms, and (f) power plants (e.g., nuclear).

Aspects of the System

In preferred embodiments, the system of the invention includes one or more of the following aspects:

(1) an environmental energy collection system configured to obtain transient high energy from an environment; and (2) a transient high energy management system configured to process transient high energy.

(1) Environmental Energy Collection System

Preferably, the environmental energy collection system includes one or more of the following aspects:

(A) an energy receptor array (e.g., of lightning rods, electromagnetic receivers, etc.) that is configured to receive energy from an environment;

(B) an energy source sensor array (e.g., of ionization sensors, voltage sensors, heat sensors, magnetism sensors, etc.) that is configured to monitor the environment for a source of energy; and (C) an energy channeling array (e.g., of energy beams, conductive filaments, etc.) that is configured to guide the energy from the source to the energy receptor array.

(2) Transient High Energy Management System

Preferably, the transient high energy management system includes one or more of the following aspects:

(D) an energy surge control array (e.g., of transient energy surge suppressors, etc.) that is configured to control the flow of energy received from the energy receptor array;

(E) an energy absorption array (e.g., of capacitor layers, graphene layers, etc.) that is configured to absorb energy from the energy surge control array; and (F) an energy storage array (e.g., of batteries, other high density storage, etc.) that is configured to store energy from the energy absorption array.

Each of these aspects will be discussed.

(1) Environmental Energy Collection System

Similar to energy being available in the environment from sunlight, wind movement, tide movement, and geothermal energy, energy is available from the environment in other forms, such as clouds of ionized particles, currents of electrons, currents of charged particles, and electromagnetic radiation.

A common source of energy from ionized particles in the environment is lightning. Electrically conductive rods and structures can attract ionized energy, and are used to attract ionized energy when used as lighting rods, which are designed to attract lightning and direct the energy of the lightning into the ground to be absorbed without harm to surrounding people and infrastructure.

Other environmental sources of energy include sources of ionizing radiation such as, without limitation, coronal mass ejections, solar winds, ultraviolet rays, magnetic fields, and volcanos.

Other environmental sources of energy include sources of electromagnetic radiation, such as, without limitation, voltage surges, nuclear blasts, planetary magnetospheres, coronal mass ejections, and ionized plasma.

If these energies can be obtained from the environment, and thereafter managed, they can serve as alternative, or additional sources of energy at potentially lower costs and greater efficiencies. The system of the invention is configured to collect and manage these and other energies, whether environmental or man-made.

(A) Energy Receptor Array

With regard to the energy receptor array of the environmental energy collection system, the receptor array is preferably configured to receive energy from an environment.

(i) Ionized Energy Receipt Configuration

While any suitable configuration can be used, a preferred configuration includes one or more electrically conductive structures and/or equipment that can charge and channel atmospheric or environmental ionization. While any suitable electrically conductive structures can be used, preferred structures are vertically extending electrically conductive rods, filaments, particles, or other electrical current receptors.

Preferably, one or more attraction points, or rods, of the array are arranged to be spaced from one another to cover a greater area (vertically, horizontally, or both) than would more tightly spaced or fewer attraction points. While any spacing arrangement can be used, a grid in which the attraction points are evenly spaced is preferred due to efficiency and predictability benefits.

Preferred rods contain highly conductive, low resistance metals to facilitate rapid transfer of large voltages. Suitable rods and other structures can alternatively or additionally be formed of multiple materials and can, in certain embodiments, include a ground line within or attached, from which absorption and distribution branches can be connected.

Further preferably, in order to increase the array's attractiveness to lightning, or otherwise direct ionization pathways of a particular node in the array to lightning, a height of one or more aspects of the receptor array can be increased.

(ii) Electromagnetic Radiation Receipt Configuration

Another preferred configuration includes one or more electromagnetic receivers. With regard to electromagnetic energy, any suitable method of electromagnetic conduction and/or transduction can be utilized for collecting and transferring the energy.

(B) Energy Source Sensor Array

With regard to the energy source sensor array of the environmental energy collection system, the sensor array is preferably configured to monitor the environment for a source of energy.

While lightning phenomena does occur, and in certain locations occurs more frequently, efficiency of the system can be increased by monitoring the environment for sources of ionized particles or other energy and guiding the ionized particles or other energy from the source to the energy receptor array. The energy source sensor array of the invention is configured to monitor the environment for sources of ionized particles and other energy. The energy channeling array (discussed below) is configured to guide the ionized particles or other energy from the source to the energy receptor array.

Certain measurable phenomena may be present in an environment that is a potential source of ionized energy or other energy. The level of the phenomena in the environment can indicate a likelihood of increased frequency of high energy events (e.g., lightning "strikes") in the environment, and in certain cases, indicate that an high energy event will occur immediately. Depending on the phenomena, the level of the phenomena in a certain locale of the environment can indicate an impending high energy event.

Phenomena that may provide such indications include but are not limited to ionization, voltage, vibrations, heat, light, sound, radio, radiation, electromagnetism, and electrical disturbances as measured with lasers. Accordingly, sensors that can detect levels of such phenomena can be utilized to determine a likelihood in the environment that a high energy event will occur and, in certain cases, where it will occur in the environment (e.g., in which locale).

Accordingly, the energy source sensor array of the invention preferably includes one or more sensors to monitor the environment for a source of energy, and further preferably, an approximate or definitive location of an impending high energy event. More preferably, to increase the efficiency of the energy source sensor array of the invention, one or more sensors of the array are preferably arranged to be spaced from one another to cover a greater area (vertically, horizontally, or both) than would more tightly spaced or fewer sensors. While any spacing arrangement can be used, a grid in which the sensors are evenly spaced is preferred due to efficiency and predictability benefits.

(C) Energy Channeling Array

With regard to the energy channeling array of the environmental energy collection system, the energy channeling array is preferably configured to guide ionized particles, electrically conductive paths or other energy from the source to the energy receptor array or vice versa.

As discussed above, efficiency of the system can be increased not only by monitoring the environment for sources of ionized particles or other energy, but also by guiding the ionized particles or other energy from the source to the energy receptor array or vice versa. That is, it is helpful to know when and where a high energy event will occur in an environment, but that knowledge is more useful if the energy receptor array can actively take advantage of each occurrence, rather than passively take advantage of only occurrences that are near nodes of the array. Accordingly, the energy channel array of the invention is configured to guide the ionized particles or other energy from the source to the energy receptor array or vice versa.

Certain devices and techniques can be used to direct ionized energy or other energy. Such channeling devices and techniques include but are not limited to channeling tool deployment devices and techniques, for deploying channeling tools such as directed energy beams (e.g., lasers), elongated conductive filaments, or a stream of particles.

With regard to directed energy beams, such beams can include but are not limited to lasers, beams of charged particles, and other optical beams. For example, lasers can interact with atmospheric charged particles to induce electrical breakdown and direct electrical discharge within clouds containing ionized particles, and therefore be used to guide lightning over long distances with precision control to specified targets.

With regard to elongated conductive filaments or a stream of particles, such filaments or particles can be propulsed or flown (e.g., by drone) into atmospheric ionized energy fields and then energized to support the directional flow of charged particles.

Accordingly, the energy channeling array of the invention preferably includes one or more of such devices and use of such accompanying techniques to guide the ionized particles or other energy from the ionized energy (or other energy) source (e.g., found by the ionization source sensor array) to one or more nearby nodes of the energy receptor array.

(2) Transient High Energy Management System

Once the transient high energy enters the energy receptor array, whether through an environmental source (e.g., lightning, ionization clouds, solar winds) or an artificial source (e.g., rapid charger or electromagnetic blast), the energy preferably is managed quickly, efficiently, and fully in order to maximize its potential for use.

An important feature of the invention is to move the processing of energy from being external to the use device (e.g., a vehicle or building), to being internal to the use device.

For example, in the case of a vehicle, current electric powered vehicles receive energy into a charging port at low voltage and over a long period of charging time, and can process such energy for storage and use under those conditions. The present invention instead enables a vehicle to receive energy into a charging port at high flow nearly instantaneously, whether artificially from a high speed, high voltage rapid charger, or naturally from the environment (e.g., from lightning or electromagnetic fields), and process the energy for storage and use under those conditions. Therefore, the invention significantly reduces the amount of time users of the vehicle must wait between charges, potentially reduces the cost of the energy, and potentially increases the convenience of obtaining the energy.

Further for example, in the case of a building, energy is presently supplied to the building after passing through a series of step-down transformers external to the building, and appliances in the building obtain the energy at low voltage and slowly from receptacles in the building that are connected to the external source. The present invention instead enables a building to receive energy at high flow nearly instantaneously, and process the energy for storage and use by the appliances. Therefore, the invention enables buildings to obtain energy from transient high energy sources, such as artificial high speed, high voltage sources, or naturally from the environment (e.g., from lightning or electromagnetic fields) alternatively or in addition to traditional energy sources and in doing so, potentially reduces the cost of the energy and increases the convenience of obtaining the energy.

(D) Energy Surge Control Array

With regard to the energy surge control array of the transient high energy management system, the control array is preferably configured to control energy flow received from the energy receptor array or a direct energy source.

Ionized energy or other energy received from transient high energy sources (e.g., lightning) is received at high voltage and/or high flow rates, and as such, if the energy is directed to end use devices under such conditions, the devices would be destroyed and users of the devices would suffer death or great bodily harm. Accordingly, the energy flow received from the energy receptor array is preferably controlled prior to continuing to the remainder of the system unless system capacities are capable of absorbing energy flows without the energy surge control array.

The energy surge control array is preferably configured to control energy flow received from the energy receptor array. While any suitable configuration can be used, a preferred configuration includes one or more transient energy surge suppressors such as, for example, transient voltage surge suppressors (TVSS). A TVSS is equipment that serves to control flow from transient high voltage events (e.g., lightning "strikes" or sudden switching of large loads). Many TVSS devices work by clamping voltages to a safe level so that downstream equipment is not destroyed or otherwise negatively affected.

(i) T-Junction TVSS Configuration

A preferred TVSS configuration includes a "T" junction with two outlets: a use outlet providing a controlled voltage flow and an overflow outlet allowing any overflow energy to pass through. In the present invention, in a parallel set of TVSSs, the overflow of each TVSS leads to another, downstream TVSS, until the final overflow is of a sufficiently controlled flow or excess energy is released to ground. In such a configuration, all of the energy of a transient high voltage energy event (or other high energy event) can enter the system and be directed through multiple use outlets, and at a controlled voltage flow from each use outlet.

(ii) Radial TVSS Configuration

An alternate or additional TVSS configuration includes an inlet with a plurality of outlets, directed radially outward, that each provide a controlled voltage flow. A preferred radial surge controller includes a core channeled path and extending controlled feeds that act as branches to the energy absorption array. Multiple radial surge controllers can be provided to function, for example, as pipes running in parallel, all connected to the energy flows from the energy receptor array.

(E) Energy Absorption Array

With regard to the energy absorption array of the transient high energy management system, the absorption array is preferably configured to absorb energy from the energy surge control array.

Although the received energy is at this point in the system flowing at a controlled rate that presents little to no danger to people or equipment, it will be wasted unless it is used immediately or stored for later use. While in certain embodiments of the invention the energy can be used directly from the use outlets (e.g., to power the system itself or related appliances), in many embodiments it will be necessary or desirable to absorb the energy and then store the absorbed energy for later use.

The energy absorption array is preferably configured to absorb energy from the energy surge control array. While any suitable configuration can be used, a preferred configuration includes an array of supercapacitors.

For example, in certain embodiments, a large array of supercapacitors can be optimized to maximize power density such that rapid uptake of electrical charge is possible given the controlled feed provided. Once filled, these primary layers of capacitance could be gated to prevent overcharging while enabling transfer of energy to the subsequent layers of capacitance, which would ideally contain a greater degree of energy density with amenable power density (i.e., rate of uptake) to receive charge from the primary layers. Subsequent layers of capacitance can be added to the system to allow maximal capture and potential storage of the energy. The supercapacitors could comprise the initial layers of the energy absorption array, which sits as a branch downstream from a controlled feed from the energy surge control array.

Accordingly, the capacitors are preferably arranged in one or more capacitance layers, each layer having one or more capacitors arranged in parallel and/or series, each downstream layer being greater in capacitance than its immediately upstream layer, so as to provide an array that quickly and efficiently absorbs all of the energy from the energy surge control array.

Other preferred configurations of the energy absorption array can additionally or alternatively include one or more layers of conductive chemicals or nano-particles (e.g., graphene).

Other preferred configurations of the energy absorption array can additionally or alternatively include a plurality of electromagnetic receivers. An array of electromagnetic receivers can be configured such that they are disposed in parallel and/or in series and connected to an absorption array branch that is sufficiently sized to continuously absorb and transfer energy being produced by the electromagnetic receivers over the duration of the electromagnetic transient high energy event.

Accordingly, at an end of the energy absorption array, the energy is output at a voltage and flow that can be readily accepted by batteries for long term storage.

(F) Energy Storage Array

With regard to the energy storage array of the transient high energy management system, the storage array is preferably configured to store energy from the energy absorption array.

As discussed above, the energy is output from the energy absorption array at a voltage and flow that can be readily accepted by batteries, or other forms of high density power storage, for long term storage. While in certain embodiments of the invention the energy can be used directly from the output of the energy absorption array (e.g., to power the system itself or related appliances), in many embodiments it will be necessary or desirable to store the absorbed energy for later use.

The energy storage array is preferably configured to store energy from the energy absorption array. While any suitable configuration can be used, a preferred configuration includes one or more high density batteries. Other suitable configurations can include chemical products (e.g. solid state chemistries or electrolytic solutions) or other high density energy storage mediums.

In preferred embodiments, the batteries are arranged in a grid or other configuration to maximize space efficiency (e.g., conforming to an interior shape of a vehicle) and ease of maintenance. In certain embodiments, one or more batteries can be easily disconnected from the grid and transported elsewhere. In certain embodiments, one or more batteries can be easily disconnected from the grid and replaced with an empty or partially empty battery for recharging while the batteries being replaced are transported elsewhere for use or offsite storage.

Accordingly, long term storage of the energy is provided by the energy storage array, from which the energy can be obtained for a variety of uses.

ADDITIONAL EMBODIMENTS

The invention now will be described more fully hereinafter with reference to the accompanying drawings, which are intended to be viewed in conjunction with both this summary, the detailed description, and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough and complete and will fully convey the full scope of the invention to those skilled in the art.

DETAILED DESCRIPTION OF PREFERRED EMBODIMENTS

Following are more detailed descriptions of various concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The invention provides, in preferred embodiments, a large energy absorption and distribution system. In the illustrated embodiments, like numbered elements preferably have like features except as otherwise discussed.

Figure 1:
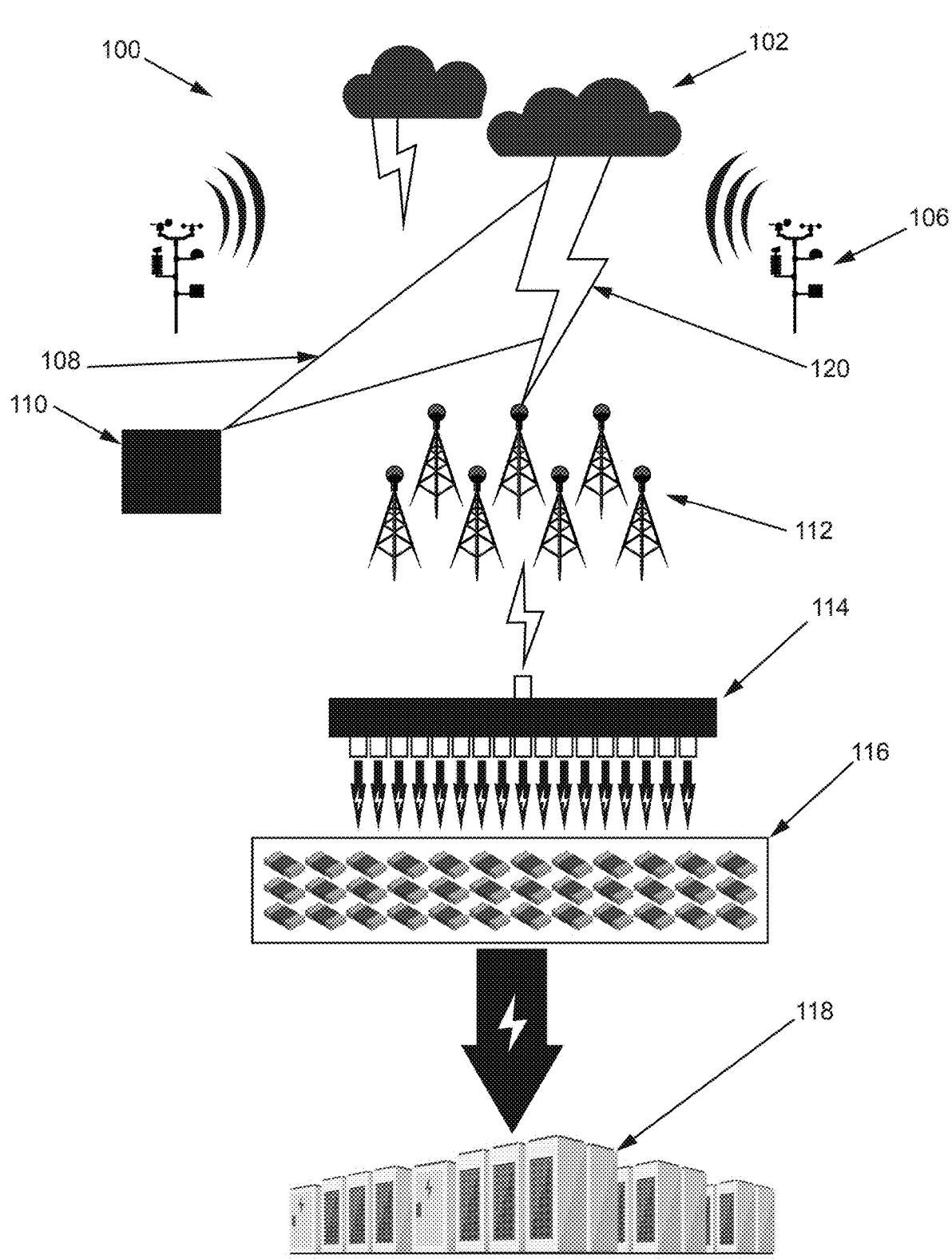
FIG. 1 illustrates a first preferred embodiment of the invention, as a stationary energy collection and storage farm.

Referring now to FIG. 1, a first preferred embodiment of the invention is illustrated as a stationary energy collection and storage farm 100.

An energy receptor array 112 includes a grid of evenly spaced vertically extending electrically conductive receivers spread out across acres of area at a geographic location in an environment 102 that is likely to experience transient high energy events (e.g., lightning generation 120). This configuration increases a likelihood of the receptor array 112 attracting energy more frequently than would other configurations.

An energy source sensor array 106 includes a grid of evenly spaced environmental sensors placed throughout the geographic location. This configuration increases a likelihood of the sensor array 106 finding energy sources more reliably than would other configurations.

An energy channeling array 110 includes at least one energy channeling device configured to deploy an energy channeling tool 108 (e.g., laser or conductive filament). Once the energy source sensor array 106 locates a high energy event (e.g., lightning generation 120) at a locale in the environment 102, the energy channeling array 110 emits and manipulates the channeling tool 108 to direct the energy 120 to one of the receivers of the energy receptor array 112.

An energy surge control array 114 includes one or more energy surge suppressors (e.g., transient voltage surge suppressors) (e.g., arranged in parallel and/or in series) housed in a suitable structure. The energy 120 received by the energy receptor array 112 passes from the energy receptor array 112 to at least one intake of the energy surge control array 114 and through the energy surge control array 114 to one or more use outlets of the energy surge control array 114. The energy surge control array 114 is configured to efficiently deliver the energy from the use outlets at a controlled flow. Such a configuration preferably enables all of the energy to pass through the energy surge control array 114 to the remainder of the system with minimal energy wasted.

An energy absorption array 116 includes a plurality of capacitance devices (e.g., supercapacitors and/or graphene layers) in a suitable arrangement (e.g., layers of decreasing capacitance) and housed in a suitable structure. The energy from the use outlets of the energy surge control array 114 passes into the energy absorption array 116 and is absorbed by the capacitance devices, preferably in full, before being output from the energy absorption array 116 at a flow that can be readily accepted by an energy storage array 118. Such a configuration preferably enables all of the energy to be directed to the energy storage array 118 for storage and later use, and as such, minimal energy is wasted.

The energy storage array 118 includes a plurality of high density storage devices (e.g., batteries), in a space-saving and safety-maximizing arrangement (e.g., a grid). The energy from the energy absorption array 116 passes into the energy storage array 118 and can be stored in long-term storage until needed. Preferably, the energy storage array 118 includes transportability and maintenance features that provide for efficient delivery and use of the stored energy.

Preferably, this system configuration enables all of the energy received by the transient high energy event to be collected, managed, and stored for later use.

Figure 2:
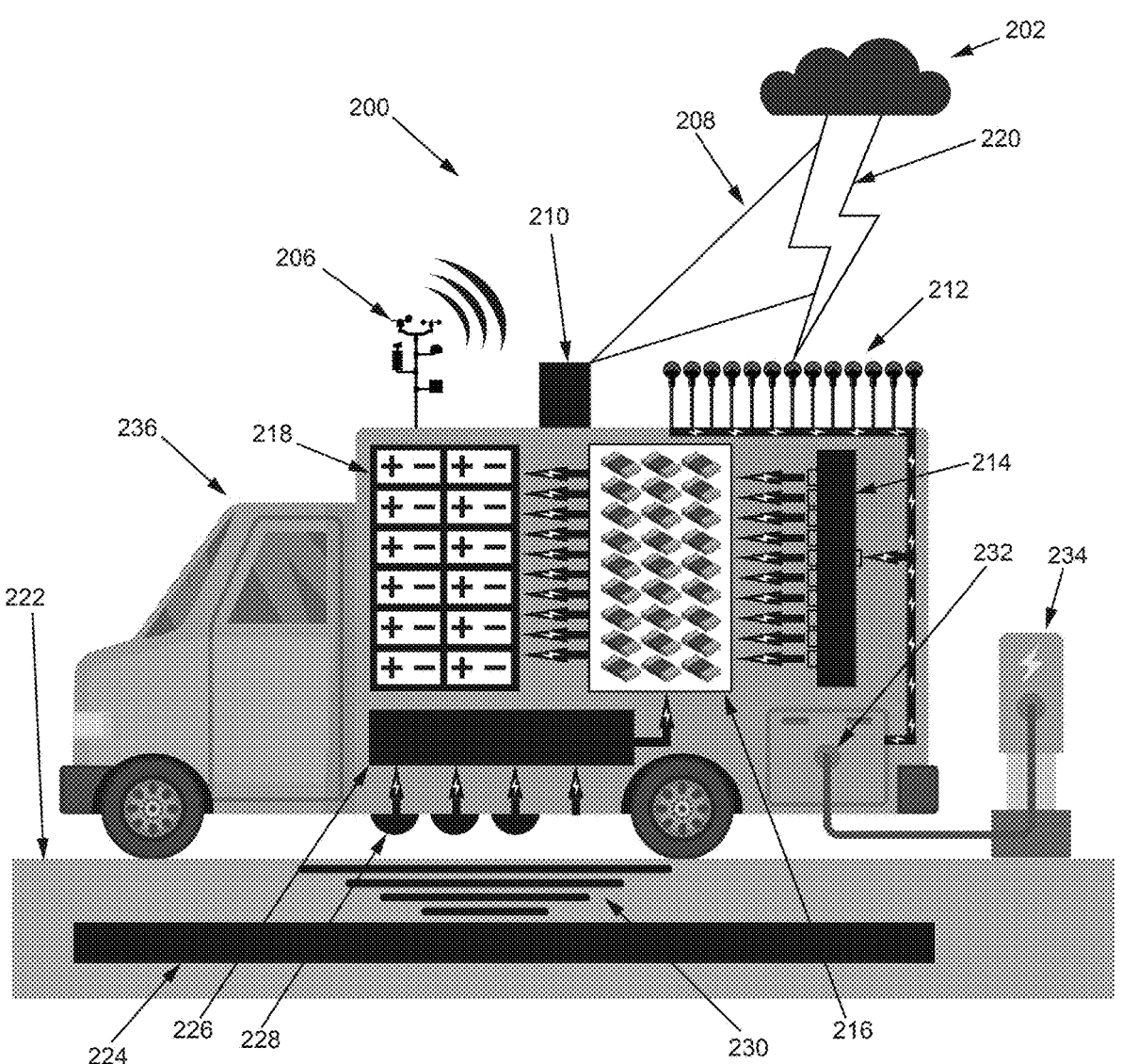
FIG. 2 illustrates a second preferred embodiment of the invention, as a mobile energy collection and storage vehicle.

Referring now to FIG. 2, a second preferred embodiment of the invention is illustrated as a mobile energy collection and storage vehicle 200. While a truck 236 is illustrated, any vehicle can be accordingly outfitted as illustrated, including without limitation, a truck, car, SUV, aircraft, seacraft, spacecraft, or any other vehicle.

A first energy receptor array 212 includes a grid of evenly spaced vertically extending electrically conductive receivers located on a surface (e.g., a top surface) of the vehicle. Preferably, the vehicle can travel to one or more locations with one or more environments 202 that are likely to experience transient high energy events (e.g., lightning generation 220). This mobile configuration increases a likelihood of the receptor array 212 attracting energy more frequently than would other configurations.

With respect to the first energy receptor array 212, an energy source sensor array 206 includes at least one environmental sensor located on the surface of the vehicle. The sensor is preferably able to obtain information about nearby locations (or other locations to which the vehicle can travel) with environments likely to experience transient high energy events (e.g, lightning generation 220). The vehicle can then travel to such locations to collect and manage the energy from such events. This mobile configuration increases a likelihood of the sensor array 206 finding energy sources more reliably than would other configurations.

Further with respect to the first energy receptor array 212, an energy channeling array 210 includes at least one energy channeling device configured to deploy an energy channeling tool 208 (e.g., laser or conductive filament). Once the energy source sensor array 206 locates a high energy event (e.g., lightning generation 220) at a locale in an environment 202, the energy channeling array 210 emits and manipulates the channeling tool 208 to direct the energy 220 to one of the receivers of the energy receptor array 212.

A second energy receptor array 232 includes at least one high energy rapid charging port located on the vehicle. The rapid charging port is preferably configured to accept transient high energy (e.g., a "burst" of high energy) from a transient high energy supply event (e.g., a rapid flow of high energy, in contrast to a slow flow of low energy) provided by a transient high energy supply source 234.

In connection with the first energy receptor array 212 and the second energy receptor array 232, a first energy surge control array 214 includes one or more energy surge suppressors (e.g., transient voltage surge suppressors) (e.g., arranged in parallel and/or in series) housed in a suitable structure on board the vehicle. The energy received by the first energy receptor array 212 passes from the first energy receptor array 212 to at least one intake of the first energy surge control array 214 and through the first energy surge control array 214 to one or more use outlets of the first energy surge control array 214. Similarly, the energy received by the second energy receptor array 232 passes from the second energy receptor array 232 to at least one intake of the first energy surge control array 214 and through the first energy surge control array 214 to one or more use outlets of the first energy surge control array 214.

The first energy surge control array 214 is configured to efficiently deliver the energy from the use outlets at a controlled flow. Such a configuration preferably enables all of the energy received by the first energy receptor array 212 and the second energy receptor array 232 to pass through the first energy surge control array 214 to the remainder of the system with minimal energy wasted.

A third energy receptor array 228 includes evenly spaced electromagnetic energy receivers located on the surface (e.g., a bottom surface) of the vehicle. Preferably, the vehicle can travel to one or more locations with at least one source 224 (e.g., environmental or man-made) of electromagnetic energy 230 that can be received by the third energy receptor array 228. This mobile configuration increases the ability of the receptor array 228 to obtain energy more frequently than would other configurations. A second energy surge control array 226 is configured to efficiently deliver the electromagnetic energy received by the third energy receptor array 228 from an outlet of the second energy surge control array 226 at a controlled flow.

With regard to the first energy receptor array 212, the second energy receptor array 232, and the third energy receptor array 228, energy from the first energy surge control array 214 and the second energy surge control array 226 is provided at a controlled flow to an energy absorption array 216. The energy absorption array 116 includes a plurality of capacitance devices (e.g., supercapacitors and/or graphene layers) in a suitable arrangement (e.g., layers of decreasing capacitance) and housed in a suitable structure. The energy from the use outlets of the first energy surge control array 214 and the second energy surge control array 226 passes into the energy absorption array 216 and is absorbed by the capacitance devices, preferably in full, before being output from the energy absorption array 216 at a flow that can be readily accepted by an energy storage array 218. Such a configuration preferably enables all of the energy to be directed to the energy storage array 218 for storage and later use, and as such, minimal energy is wasted.

The energy storage array 218 includes a plurality of high density storage devices (e.g., batteries), in a space-saving and safety-maximizing arrangement (e.g., a grid). The energy from the energy absorption array 216 passes into the energy storage array 218 and can be stored in until needed, whether by the vehicle for use to power on-board systems, or for delivery to other vehicles, buildings, or devices.

Preferably, this system configuration enables all of the energy received by the transient high energy events to be collected, managed, and stored for later use.

Figure 3:
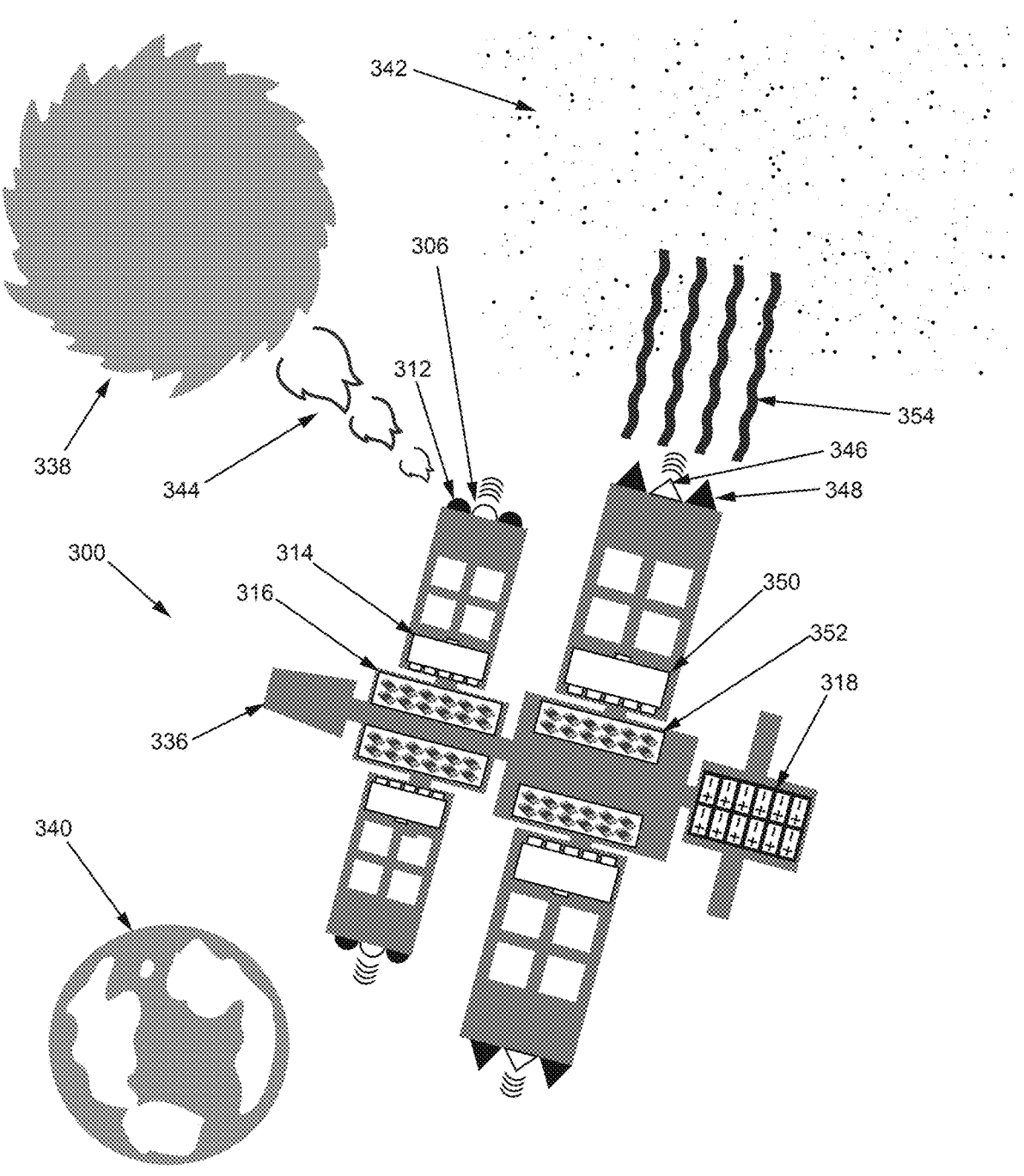
FIG. 3 illustrates a third preferred embodiment of the invention, as a space-faring energy collection and storage vehicle.

Referring now to FIG. 3, a third preferred embodiment of the invention is illustrated as a space-faring energy collection and storage vehicle 300. While a space station 336 is illustrated, any space-faring vehicle can be accordingly outfitted as illustrated, including without limitation, a satellite, space station, rocket, rover, or any other vehicle.

A first energy receptor array 312 includes a grid of evenly spaced vertically extending electrically conductive receivers located on a surface (e.g., an edge surface) of the vehicle. Preferably, the vehicle can be placed in or travel to one or more locations with one or more environments that are likely to experience transient high energy events (e.g., ionized plasma 344 from coronal mass ejections from a sun 338). This configuration increases a likelihood of the receptor array 312 obtaining energy in greater quantities than would other configurations.

With regard to the first energy receptor array 312, an energy source sensor array 306 includes at least one environmental sensor located on the surface (e.g., the edge surface) of the vehicle. The sensor is preferably able to obtain information about nearby interplanetary or interstellar locations (or other locations to which the vehicle can travel) with environments likely to experience transient high energy events (e.g, ionized plasma generation 344). The vehicle can then travel to such locations to collect and manage the energy from such events. This configuration increases a likelihood of the sensor array 306 finding energy sources more reliably than would other configurations.

Further with regard to the first energy receptor array 312, a first energy surge control array 314 includes one or more energy surge suppressors (e.g., transient voltage surge suppressors) (e.g., arranged in parallel and/or in series) housed in a suitable structure on board the vehicle. The energy received by the first energy receptor array 312 passes from the first energy receptor array 312 to at least one intake of the first energy surge control array 314 and through the first energy surge control array 314 to one or more use outlets of the first energy surge control array 314. The first energy surge control array 314 is configured to efficiently deliver the energy from the use outlets at a controlled flow. Such a configuration preferably enables all of the energy received by the first energy receptor array 312 to pass through the first energy surge control array 314 to the remainder of the system with minimal energy wasted.

Further with regard to the first energy receptor array 312, energy from the first energy surge control array 314 is provided at a controlled flow to a first energy absorption array 316. The first energy absorption array 316 includes a plurality of capacitance devices (e.g., supercapacitors and/or graphene layers) in a suitable arrangement (e.g., layers of decreasing capacitance) and housed in a suitable structure. The energy from the use outlets of the first energy surge control array 314 passes into the first energy absorption array 316 and is absorbed by the capacitance devices, preferably in full, before being output from the first energy absorption array 316 at a flow that can be readily accepted by an energy storage array 318.

A second energy receptor array 348 includes a grid of evenly spaced ionized radiation energy receivers located on the surface (e.g., the edge surface) of the vehicle. Preferably, the vehicle can be placed in or travel to one or more locations with at least one source of ionized energy that can be received by the second energy receptor array 348 (e.g., ionized radiation 354 from space phenomena 342). This mobile configuration increases the ability of the receptor array 348 to obtain energy in remote locations than would other configurations.

With regard to the second energy receptor array 348, an energy source sensor array 346 includes at least one environmental sensor located on the surface (e.g., the edge surface) of the vehicle. The sensor is preferably able to obtain information about nearby interplanetary or interstellar locations (or other locations to which the vehicle can travel) with environments likely to experience transient high energy events (e.g, ionized radiation generation 354). The vehicle can then travel to such locations to collect and manage the energy from such events. This configuration increases a likelihood of the sensor array 346 finding energy sources more reliably than would other configurations.

Further with regard to the second energy receptor array 348, a second energy surge control array 350 includes one or more energy surge suppressors (e.g., transient voltage surge suppressors) (e.g., arranged in parallel and/or in series) housed in a suitable structure on board the vehicle. The energy received by the second energy receptor array 348 passes from the second energy receptor array 348 to at least one intake of the second energy surge control array 350 and through the second energy surge control array 350 to one or more use outlets of the second energy surge control array 350. The second energy surge control array 350 is configured to efficiently deliver the energy from the use outlets at a controlled flow. Such a configuration preferably enables all of the energy received by the second energy receptor array 348 to pass through the second energy surge control array 350 to the remainder of the system with minimal energy wasted.

Further with regard to the second energy receptor array 348, energy from the second energy surge control array 350 is provided at a controlled flow to a second energy absorption array 352. The second energy absorption array 352 includes a plurality of capacitance devices (e.g., supercapacitors and/or graphene layers) in a suitable arrangement (e.g., layers of decreasing capacitance) and housed in a suitable structure. The energy from the use outlets of the second energy surge control array 350 passes into the second energy absorption array 352 and is absorbed by the capacitance devices, preferably in full, before being output from the second energy absorption array 352 at a flow that can be readily accepted by the energy storage array 318.

Such a configuration preferably enables all of the energy to be directed to the energy storage array 318 for storage and later use, and as such, minimal energy is wasted.

The energy storage array 318 includes a plurality of high density storage devices (e.g., batteries), in a space-saving and safety-maximizing arrangement (e.g., a grid). The energy from the first energy absorption array 316 and the second energy absorption array 352 passes into the energy storage array 318 and can be stored in until needed, whether by the vehicle for use to power on-board systems, or for delivery to other vehicles, structures, or devices.

Preferably, this system configuration enables all of the energy received by the transient high energy events to be collected, managed, and stored for later use.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. An energy absorption and distribution system, comprising:
   an environmental energy collection system; and
   a transient high energy management system,
   wherein the environmental energy collection system includes
      an energy receptor array configured to receive energy from an environment;
      an energy source sensor array configured to monitor the environment for a source of energy; and
      an energy channeling array configured to guide energy from the source to the energy receptor array;
   and wherein the transient high energy management system includes
      an energy surge control array configured to control a flow of energy received from the energy receptor array;
      an energy absorption array configured to absorb energy from the energy surge control array; and
      an energy storage array configured to store energy from the energy absorption array;
   and wherein the energy surge control array includes a plurality of transient voltage surge suppressors configured to direct the flow of energy to a plurality of use outlets, each use outlet having a controlled voltage flow, and to allow overflow energy to pass through to a final overflow having a voltage flow at least as controlled as the flows of the outlets;
   and wherein an aggregate energy output from the use outlets and the final overflow is substantially equivalent to the flow of energy received from the energy receptor array.

2. The energy absorption and distribution system of claim 1, wherein the energy receptor array includes one or more of an electrical current receptor, ionized energy receptor, an electromagnetic energy receptor, and an ionized plasma receptor.

3. The energy absorption and distribution system of claim 2, wherein the energy receptor array includes a plurality of conductive nodes arranged in a grid on a surface of a vehicle.

4. The energy absorption and distribution system of claim 1, wherein the energy source sensor array includes one or more of an ionization sensor, a voltage sensor, a heat sensor, a magnetic field sensor, and a radiation sensor.

5. The energy absorption and distribution system or claim 4, wherein the energy source sensor array includes a plurality of sensors arranged in a formation on a surface of a vehicle.

6. The energy absorption and distribution system of claim 1, wherein the energy channeling array includes at least one channeling tool deployment device configured to deploy a channeling tool.

7. The energy absorption and distribution system or claim 6, wherein the channeling tool is one or more of an optical beam and a conductive filament.

8. The energy absorption and distribution system of claim 1, wherein each of the transient energy surge suppressors includes a T junction having one of the use outlets and an overflow outlet allowing the overflow energy to pass through, the transient energy surge suppressors being arranged in parallel sets such that overflow of each transient voltage surge suppressors leads to another downstream transient voltage surge suppressor, until reaching the final overflow.

9. The energy absorption and distribution system or claim 1, wherein the transient voltage surge suppressors are configured with an inlet and the plurality of use outlets, the use outlets being directed radially outwardly, the final overflow being one of the use outlets.

10. The energy absorption and distribution system of claim 1, wherein the energy absorption array includes one or more capacitance layers, each layer having one or more capacitors arranged in parallel, each downstream layer being greater in capacitance than its immediately upstream layer.

11. The energy absorption and distribution system of claim 1, wherein the energy absorption array includes one or more capacitance layers, each layer having one or more capacitors arranged in series, each downstream layer being greater in capacitance than its immediately upstream layer.

12. The energy absorption and distribution system of claim 1, wherein the energy storage array includes a plurality of high density batteries configured to power one or more on-board systems.

13. The energy absorption and distribution system or claim 1, wherein the energy storage array includes a plurality of high density batteries conforming to an interior shape of a vehicle.

14. A method of absorbing and distributing energy, comprising:

using an environmental energy collection system, collecting environmental transient high energy; and using a transient high energy management system, managing the transient high energy, wherein collecting the transient high energy includes using an energy sensor array, monitoring an environment for a source of the transient high energy; and using an energy channeling array, guiding the transient high energy from the source to an energy receptor array;

using the energy receptor array, receiving the transient high energy from the environment;

and wherein managing the transient high energy includes using an energy surge control array, controlling a flow of the transient high energy received by the energy receptor array;

using an energy absorption array, absorbing energy from the energy surge control array; and using an energy storage array, storing energy from the energy absorption array;

and wherein the energy surge control array includes a plurality of transient voltage surge suppressors configured to direct the flow of energy to a plurality of use outlets, each use outlet having a controlled voltage flow, and to allow overflow energy to pass through to a final overflow having a voltage flow at least as controlled as the flows of the outlets;

and wherein an aggregate energy output from the use outlets and the final overflow is substantially equivalent to the flow of energy received from the energy receptor array.

15. The method of absorbing and distributing energy of claim 14, wherein monitoring the environment for a source of the transient high energy includes monitoring the environment for the source of the transient high energy using one or more of an ionization sensor, a voltage sensor, a heat sensor, a magnetic field sensor, and a radiation sensor.

16. The method of absorbing and distributing energy of claim 14, wherein guiding the transient high energy from the source to the energy receptor array includes guiding the transient high energy using at least one channeling tool deployment device configured to deploy at least one of an optical beam and a conductive filament.

17. The method of absorbing and distributing energy of claim 14, wherein receiving the transient high energy from the environment includes receiving the transient high energy using one or more of an ionized energy receptor, an electromagnetic energy receptor, and an ionized plasma receptor.

18. The method of absorbing and distributing energy of claim 14, wherein each of the transient energy surge suppressors includes a T junction having one of the use outlets and an overflow outlet allowing the overflow energy to pass through, the transient energy surge suppressors being either arranged in parallel sets such that overflow of each TVSS leads to another, downstream TVSS until reaching the final overflow, or configured with an inlet and the plurality of use outlets, the use outlets being directed radially outwardly, the final overflow being one of the use outlets.

19. The method of absorbing and distributing energy of claim 14, wherein absorbing energy from the energy surge control array includes absorbing energy from the energy surge control array using one or more capacitance layers, each layer having one or more capacitors arranged in at least one of series and parallel, each downstream layer being greater in capacitance than its immediately upstream layer.

20. The method of absorbing and distributing energy of claim 14, wherein storing energy from the energy absorption array includes storing energy from the energy absorption array using a plurality of high density batteries conforming to an interior shape of a vehicle.

*   *   *   *   *